United States Patent
Li et al.

(10) Patent No.: US 10,461,618 B2
(45) Date of Patent: Oct. 29, 2019

(54) PMDC MOTOR HAVING A STRUCTURE FOR PRODUCING LOW NOISE

(71) Applicant: Johnson Electric S.A., Murten (CH)

(72) Inventors: Yue Li, Hong Kong (CN); Chui You Zhou, Shenzhen (CN); Gang Li, Shenzhen (CN); Yong Wang, Shenzhen (CN); Yong Li, Shenzhen (CN); Hong Wei Zhang, Shenzhen (CN)

(73) Assignee: Johnson Electric International AG, Murten (CH)

( * ) Notice: Subject to any disclaimer, the term of this patent is extended or adjusted under 35 U.S.C. 154(b) by 154 days.

(21) Appl. No.: 15/007,720

(22) Filed: Jan. 27, 2016

(65) Prior Publication Data
US 2016/0218586 A1    Jul. 28, 2016

(30) Foreign Application Priority Data
Jan. 28, 2015    (CN) .......................... 2015 1 0044978

(51) Int. Cl.
| H02K 23/40 | (2006.01) |
| H02K 5/14 | (2006.01) |
| H02K 5/15 | (2006.01) |
| H02K 11/40 | (2016.01) |
| H02K 11/215 | (2016.01) |

(52) U.S. Cl.
CPC .......... *H02K 23/40* (2013.01); *H02K 5/145* (2013.01); *H02K 5/15* (2013.01); *H02K 11/215* (2016.01); *H02K 11/40* (2016.01); *H02K 2213/03* (2013.01)

(58) Field of Classification Search
CPC ........ H02K 5/145; H02K 5/15; H02K 11/215; H02K 11/40; H02K 2213/03; H02K 23/40

USPC ............................................ 310/51, 68 B, 71
See application file for complete search history.

(56) References Cited

U.S. PATENT DOCUMENTS

| 4,812,693 | A | * | 3/1989 | Baines | ................. | H01R 4/5066 |
| | | | | | | 310/71 |
| 9,118,235 | B2 | | 8/2015 | He et al. | | |
| 9,762,109 | B2 | * | 9/2017 | Yang | ...................... | H02K 1/165 |
| 2002/0050759 | A1 | * | 5/2002 | Shiraki | ................. | H02K 5/145 |
| | | | | | | 310/239 |

(Continued)

FOREIGN PATENT DOCUMENTS

| JP | 2006211838 | 8/2006 |
| JP | 2015156804 | 8/2015 |

OTHER PUBLICATIONS

Fumiaki et al., English Translation of JP2006211838, Oct. 8, 2006.*

*Primary Examiner* — Julio C. Gonzalez
*Assistant Examiner* — Rashad H Johnson
(74) *Attorney, Agent, or Firm* — Muncy, Geissler, Olds & Lowe, P.C.

(57) ABSTRACT

A PMDC motor has a housing, a stator magnet disposed in an interior of the housing, and a rotor core disposed within the stator magnet. A ratio of an outer diameter of the rotor core to the outer diameter of the housing is from 0.60 to 0.67. The noise of the motor during operation is reduced by increasing the thickness of the stator magnet, reducing the outer diameter of the rotor core, reducing the air gap between the magnet and the rotor core and reducing the rotational inertia of the rotor core. The motor is particularly suited for use in vehicle HVAC systems where low noise is an important requirement.

18 Claims, 6 Drawing Sheets

(56) References Cited

U.S. PATENT DOCUMENTS

| | | | |
|---|---|---|---|
| 2003/0193252 A1* | 10/2003 | Locke | F16C 32/0444 310/90.5 |
| 2005/0046292 A1* | 3/2005 | Campbell | H02K 1/30 310/90 |
| 2006/0238059 A1* | 10/2006 | Komatsu | H02K 1/14 310/162 |
| 2007/0122300 A1* | 5/2007 | Sakai | F04D 5/002 417/423.3 |
| 2008/0001496 A1* | 1/2008 | Lau | H02K 3/325 310/269 |
| 2009/0091211 A1* | 4/2009 | Huan | H02K 13/006 310/265 |
| 2009/0295241 A1* | 12/2009 | Wong | H02K 11/026 310/72 |
| 2010/0181853 A1* | 7/2010 | Wong | H02K 5/225 310/72 |
| 2012/0068566 A1 | 3/2012 | Miyajima | |
| 2012/0194023 A1* | 8/2012 | Lau | H02K 23/04 310/154.01 |
| 2012/0299405 A1* | 11/2012 | Li | H02K 23/04 310/62 |
| 2013/0307380 A1* | 11/2013 | Zeng | H02K 11/024 310/68 R |
| 2014/0049126 A1* | 2/2014 | Jiang | H02K 11/026 310/72 |
| 2017/0346350 A1* | 11/2017 | Lv | H02K 23/04 |
| 2017/0366054 A1* | 12/2017 | Li | H02K 1/17 |

\* cited by examiner

| Item | Noise | | Vibration | | Noise | | Vibration | | Noise | |
|---|---|---|---|---|---|---|---|---|---|---|
| Freq.Range | 20-20KHz | | 0-12.8KHz | | 20-20KHz | | 0-12.8KHz | | 20-20KHz | |
| Unit | dBA | | m/s2 | | dBA | | m/s2 | | dBA | |
| | bare motor | | bare motor | | gear box | | gear box | | HVAC unit | |
| No. | CW | CCW | CW | CCW | CW | CCW | CW | CCW | CW | CCW |
| p1 | 25.1 | 24.7 | 0.849 | 0.79 | 35.5 | 34.8 | 0.638 | 0.517 | 44.9 | 45.6 |
| p2 | 28.3 | 28.8 | 0.883 | 0.917 | 35.5 | 36.2 | 0.452 | 0.644 | 43.5 | 45.2 |
| p3 | 27.8 | 26.8 | 1.01 | 0.764 | 35.8 | 34.9 | 0.594 | 0.649 | 43.2 | 43.4 |
| p4 | 29.5 | 30.5 | 0.643 | 0.777 | 36.3 | 35.6 | 0.654 | 0.586 | 41.9 | 40.8 |
| p5 | 25.1 | 25.1 | 0.576 | 0.569 | 36.3 | 34 | 0.552 | 0.496 | 40.3 | 40.7 |
| Average | 27.16 | 27.18 | 0.7922 | 0.7634 | 35.88 | 35.1 | 0.578 | 0.5784 | 42.76 | 43.14 |

Fig. 11 (Prior Art)

| Item | Noise | | Vibration | | Noise | | Vibration | | Noise | |
|---|---|---|---|---|---|---|---|---|---|---|
| Freq.Range | 20-20KHz | | 0-12.8KHz | | 20-20KHz | | 0-12.8KHz | | 20-20KHz | |
| Unit | dBA | | m/s2 | | dBA | | m/s2 | | dBA | |
| | bare motor | | bare motor | | gear box | | gear box | | HVAC unit | |
| No. | CW | CCW | CW | CCW | CW | CCW | CW | CCW | CW | CCW |
| 1# | 22.4 | 22.7 | 0.348 | 0.401 | 29.5 | 30 | 0.329 | 0.305 | 40.5 | 40.6 |
| 2# | 22.2 | 22.2 | 0.266 | 0.26 | 28.8 | 28.8 | 0.227 | 0.281 | 38.5 | 38.2 |
| 3# | 23.3 | 22.2 | 0.238 | 0.26 | 28.7 | 28.1 | 0.225 | 0.24 | 41.3 | 39.9 |
| 4# | 23 | 21.9 | 0.244 | 0.263 | 29.8 | 28.2 | 0.298 | 0.257 | 40 | 37.9 |
| 5# | 21.5 | 21.7 | 0.265 | 0.27 | 27.5 | 28.5 | 0.213 | 0.223 | 38.8 | 37.7 |
| Average | 22.48 | 22.14 | 0.2722 | 0.2908 | 28.86 | 28.72 | 0.2584 | 0.2612 | 39.82 | 38.86 |
| 30 pcs samples Average | 23 | 23 | 0.3 | 0.3 | 29.2 | 29.4 | 0.3 | 0.27 | 40.8 | 39.7 |

FIG. 12

PMDC MOTOR HAVING A STRUCTURE FOR PRODUCING LOW NOISE

CROSS REFERENCE TO RELATED APPLICATIONS

This non-provisional patent application claims priority under 35 U.S.C. § 119(a) from Patent Application No. 201510044978.2 filed in The People's Republic of China on Jan. 28, 2015, the entire contents of which are hereby incorporated by reference.

FIELD OF THE INVENTION

This invention relates to an electric motor and in particular, to a low noise permanent magnet direct current (PMDC) motor.

BACKGROUND OF THE INVENTION

An electric motors is a device that converts electrical energy into mechanical energy under the principle of electromagnetic induction and can be broadly classified into direct current motors and alternating current motors, depending on the type of the input power.

PMDC motors are a type of direct current motor which has a magnetic field generated by a permanent magnet. PMDC motors are widely used in various fields, including portable electronic devices and in vehicle accessories.

Figure 1:
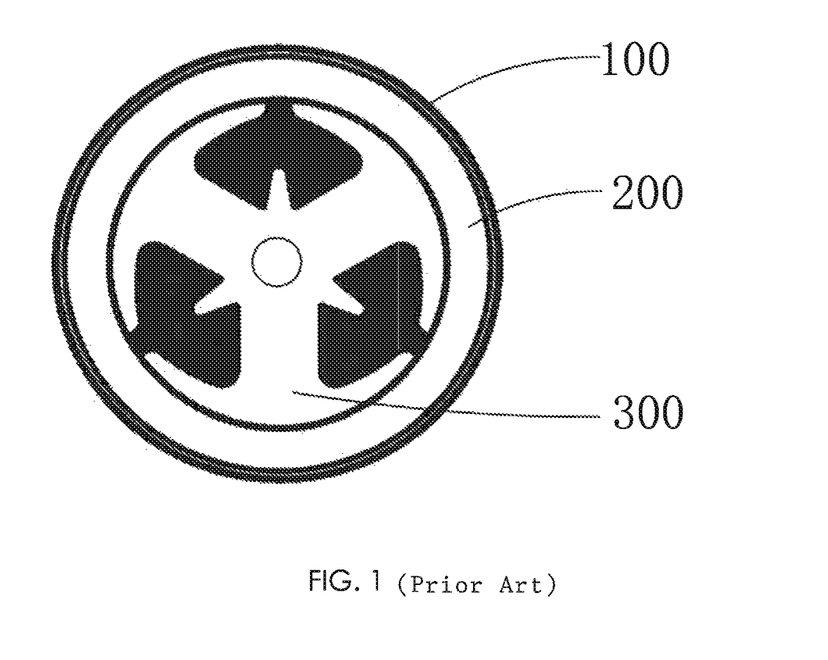
FIG. 1 is a sectional view of a housing, a stator magnet and a rotor core of a known prior art PMDC motor.

Different application fields impose different requirements on the performance of the motor. For example, in a vehicle heating, ventilation and air conditioning (HVAC) system, a PMDC motor is used to introduce fresh air into the car and is required to produce low noise. FIG. 1 illustrates a known PMDC motor used in the car HVAC system. The motor includes a housing 100, a stator magnet fixed to an inner surface of the housing 100, and a rotor core 300 disposed in an interior of the stator magnet 200. In this motor, the thickness of the stator magnet 200 is relatively small, and the outer diameter of the rotor core 300 is relatively large. In this particular example, it is 17.9 mm. As a result, the rotor core 300 has a large rotational inertia, which can easily produce noise and thus does not satisfy the consumers' low noise requirement for use in a vehicle HVAC system.

Accordingly, there is a desire for an improved low noise PMDC motor, suitable for use in a vehicle HVAC system.

SUMMARY OF THE INVENTION

Accordingly, in one aspect thereof, the present invention provides a permanent magnet direct current motor comprising: stator comprising: a housing, a stator magnet disposed in an interior of the housing, and an end cap assembly, a rotor comprising: a shaft, a rotor core mounted on the shaft and disposed within the stator magnet, rotor windings wound around the rotor core, a commutator fixed on the shaft, a plurality of commutator segments disposed on an outer surface of the commutator, wherein the end cap assembly comprises: a plastic end cap fitted to one end of the housing, a cover disposed on an outer side of the end cap, and brushes mounted to the end cap, and a ratio of an outer diameter of the rotor core to the outer diameter of the housing is from 0.60 to 0.67, inclusive.

Preferably, a positioning ring is disposed on the shaft adjacent one end of the rotor core.

Preferably, a first bearing is fitted to the shaft adjacent the positioning ring, and a spacer is disposed between the positioning ring and the bearing.

Preferably, the cover is a metal part and a bearing hub is formed in an inner surface of the cover, an end of the shaft adjacent the commutator is mounted to a second bearing fitted to the bearing hub, and a thrust bearing is disposed between a distal end of the shaft and the bearing hub in an axial direction of the shaft.

Preferably, a plurality of posts and bosses are formed on an end surface of the end cap, the cover has a plurality of through holes and positioning slots, corresponding to the posts and bosses, and the posts and bosses are disposed in the through holes and the positioning slots, respectively, to mount the cover to the end cap.

Preferably, the second bearing is fitted to a bottom of the housing, and the shaft extends through the bearing to outside the housing.

Preferably, a first vent hole is formed in a bottom of the housing, and a second vent hole is formed in the cover.

Preferably, an outer diameter of the rotor core is 15.9 mm, the stator magnet has a radial thickness of 3.2 mm, and an outer diameter of the housing is 24.6 mm.

Preferably, two motor terminals are mounted to the end cap, and the brushes comprise two finger leaf brushes, each of the brushes having one end fixedly connected to a corresponding one of the motor terminals and another end arranged to make sliding electrical contact with the commutator.

Preferably, the brushes comprises a brush arm and a vibration damper attached to the brush plate.

Preferably, a thickness of the brush arm is 0.065 mm.

Preferably, the connection points of the two brushes and the two motor terminals are located on a diameter of the end cap passing through a rotational axis of the shaft.

Preferably, the stator magnet is a ferrite magnet.

Preferably, the stator magnet is a rubber bonded magnet.

Preferably, opposite ends and slots of the rotor core are coated with an insulating resin.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

FIGS. 2 through 10 illustrate a miniature PMDC motor which is, preferably, used in an HVAC system of a vehicle, according to a preferred embodiment of the present invention. The motor has an output power of less than 2 Watts. The motor includes a housing 1, a stator magnet 2 disposed on an interior of the housing 1, a rotor and an end cap assembly. The rotor includes a shaft, a rotor core 3 mounted on the shaft and disposed within the stator magnet 2, rotor windings (not shown) wound around the rotor core 3, and a commutator 5 mounted on the shaft 4 and having a plurality of commutator segments 7 disposed on an outer surface of the commutator 5. The end cap assembly has a plastic end cap 9 disposed on one end of the housing 1, an end cover 10 disposed at an outer side of the end cap 9, and brushes 11 mounted on the end cap 9 in contact with the commutator.

Figure 2:
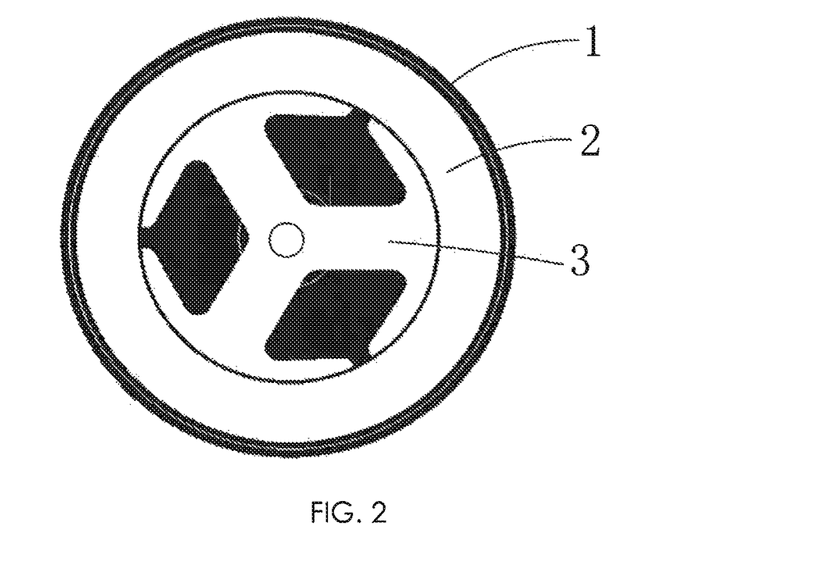
FIG. 2 is a sectional view of a housing, a stator magnet and a rotor core of a PMDC motor according to the preferred embodiment of the present invention.
Figure 3:
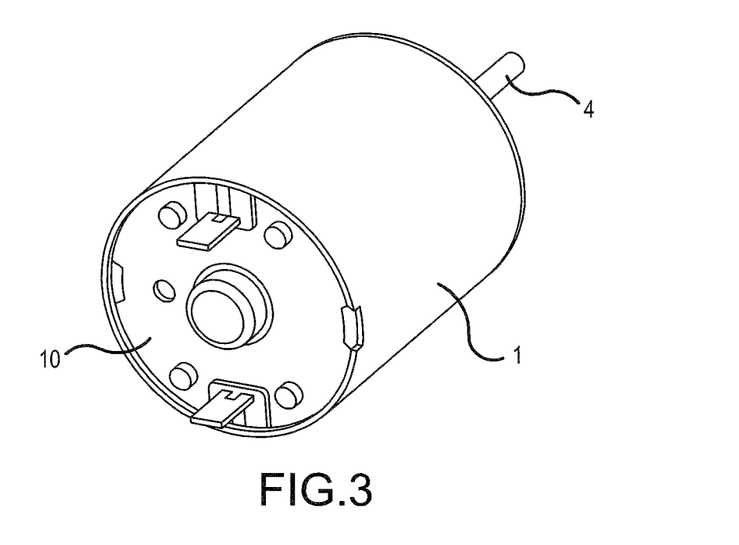
FIG. 3 illustrates the PMDC motor of FIG. 2.

A ratio of an outer diameter of the rotor core 3 to the outer diameter of the housing 1 is from 0.60 to 0.67, inclusive. Preferably, the outer diameter of the housing is about 25 mm, more preferably, 24.6 mm.

Referring to FIG. 2 in particular, when compared with the conventional motor, the stator magnet 2 has a relatively larger thickness, and the rotor core 3 has a relatively smaller outer diameter. This can reduce the rotational inertia of the rotor core 3, thereby reducing the noise produced by the permanent magnet direct current motor during operation. Preferably, the stator magnet 2 is a single piece magnet, either as a cylindrical magnet or as a rectangular slab rolled into a cylinder or ring, as is more usual for a rubber bonded magnet. Preferably the magnet is a ferrite magnet. Preferably, the magnet is fixed to the housing 1 with adhesive. The stator magnet provides two magnetic poles.

Figure 8:
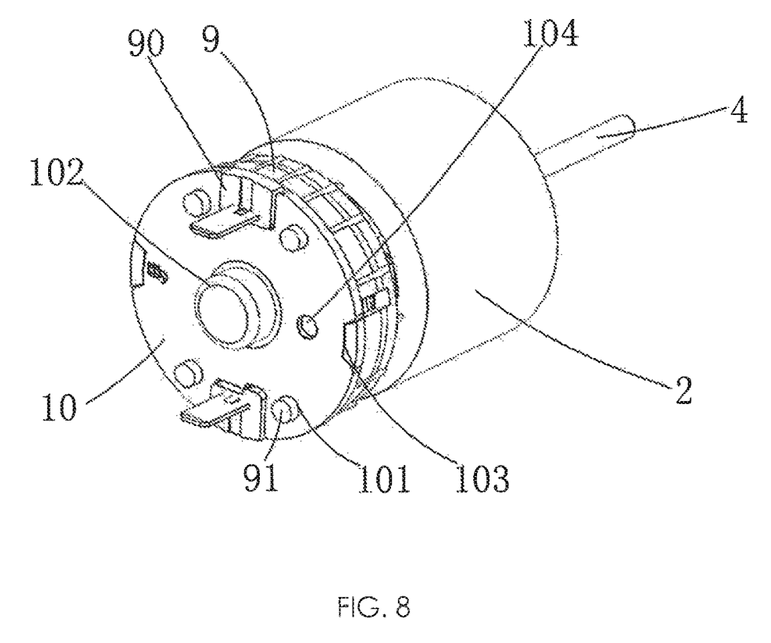
FIG. 8 shows the motor of FIG. 3 with a housing removed.
Figure 9:
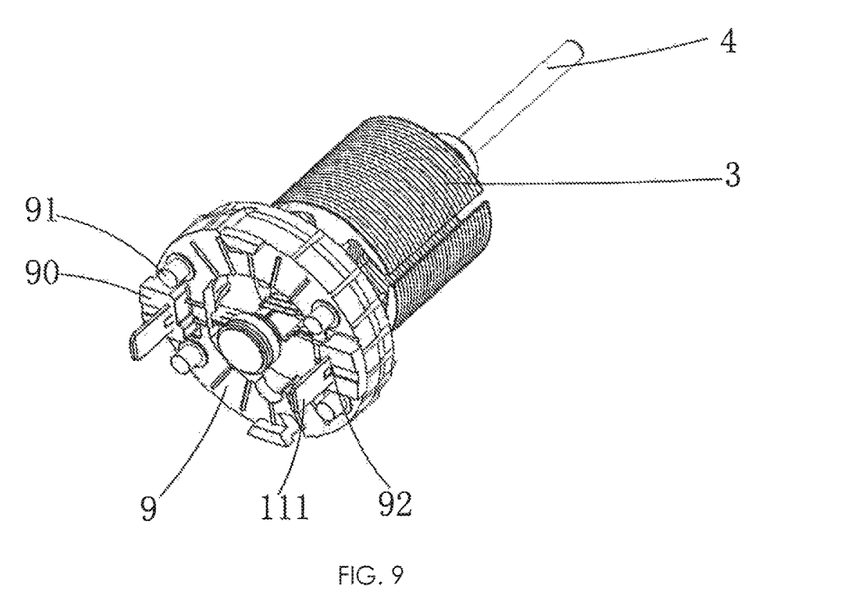
FIG. 9 is a view, similar to FIG. 8, showing an end cap, rotor core and shaft.
Figure 10:
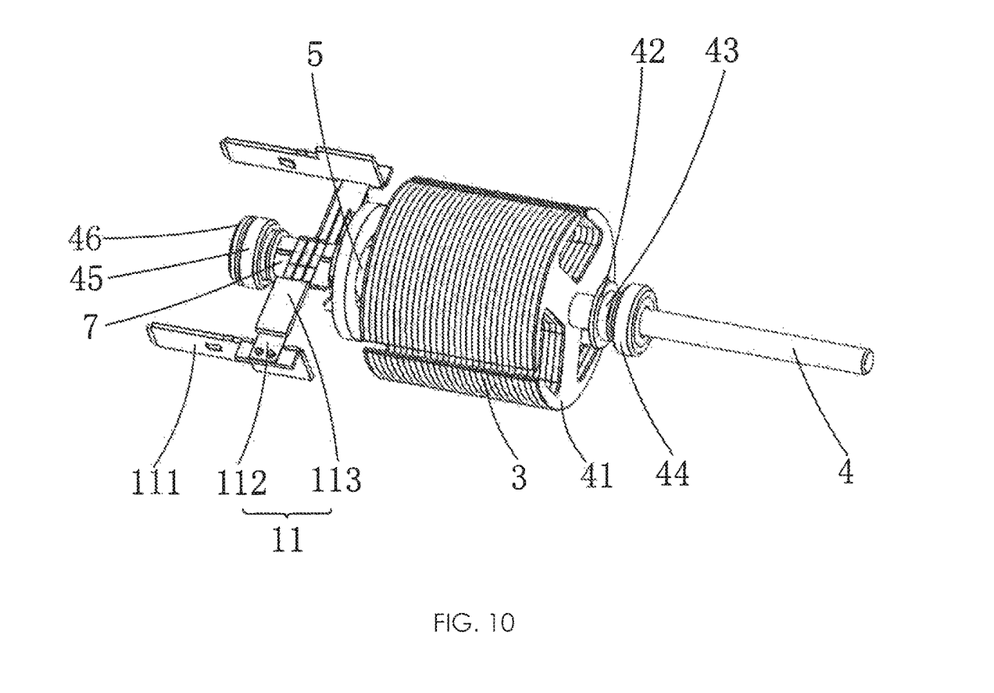
FIG. 10 is a view similar to FIG. 7, but taken from a different aspect.

Referring to FIG. 8 through FIG. 10, specifically, opposite ends and slots of the rotor core 3 are coated with an insulating resin 41. A positioning ring 42 is disposed on the shaft 4 adjacent one end of the rotor core 3. A bearing 44 is fitted on the shaft 4 adjacent the positioning ring on a side remote from the commutator 5. A spacer 43 is disposed between the positioning ring 42 and the bearing 44. An outwardly protruding bearing hub 102 is formed in an inner surface of the end cover 10. The end of the shaft 4 adjacent the commutator 5 is fitted to a bearing 45 mounted in the bearing hub 102. In this embodiment, the bearing hub 102 encloses the axial end of the shaft 4, and a thrust bearing 46 is disposed between the end of the shaft 4 and the end of the bearing hub 102, in an axial direction of the shaft 4.

The shaft 4 is rotatably mounted to the housing 1 and the end cap assembly through the two bearings 44, 45. The end of the shaft 4 remote from the commutator 5 extends through the bearing 44 and extends out of the housing 1 for driving a to-be-driven member. Preferably, the rotor core 3 includes three rotor teeth on which the rotor windings are wound. The commutator 5 includes three commutator segments 7. Ends of the rotor windings are electrically connected to the commutator segments, such that the rotor windings are connected to an external power supply through the commutator 5, the brushes 11 and motor terminals 111.

Preferably, the gap between the rotor core 3 and the stator magnet 2 is also reduced in comparison with the conventional motor. Preferably, in the present invention, the gap between the rotor core 3 and the stator magnet 2 is 0.25 mm. A plurality of posts 91 and bosses 90 are disposed on an end surface of the end cap 9. The end cover 10 has a plurality of through holes 101 and positioning slots 103, corresponding to the posts 91 and bosses 90. The posts 91 and bosses 90 of the end cap 9 are engaged in the through holes 101 and the positioning slots 103, respectively, to mount the end cap 9 to the end cover 10. The end cover 10 protects interior structures of the motor. Preferably, the posts 91 are hot staked or otherwise plastically deformed to fix the cover 10 to the plastic end cap 9. Preferably, the cover 10 is a metal part. Further, each boss 90 of the end cap forms a mounting slot 92.

As shown in FIG. 10, the brushes 11 include two finger leaf type brushes. Each brush 11 is fixed to the respective motor terminal 111, preferably by upset riveting. A brush arm 112 is perpendicularly connected to the motor terminal 111, and a vibration damper 113 attached to the brush arm 112. The brush arm has a distal end divided into a number of, preferably three, fingers, which are arranged to make sliding contact with the commutator segments 7. Preferably, the thickness of the brush arm 112 is 0.065 mm. The connection points of the two brushes and the two motor terminals are located on a diameter of the end cap 9 passing through the center of the circle. The motor terminals 111 extend from the mounting slots 92 to outside the end cap 9, for connecting with an external power supply.

Figure 4:
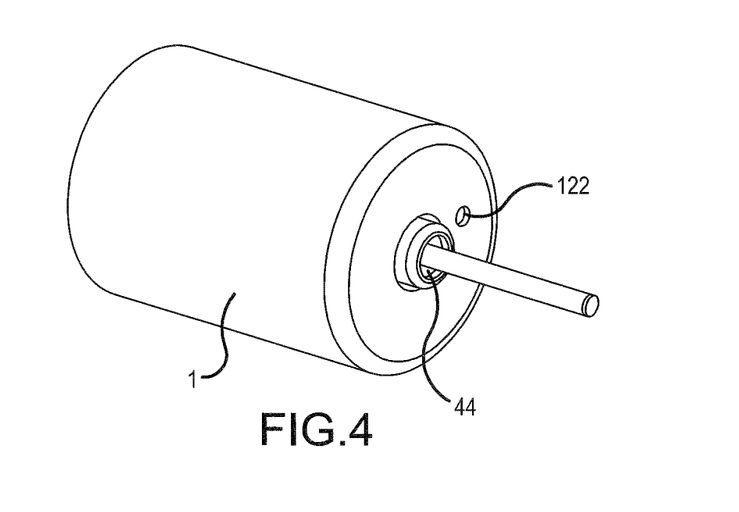
FIG. 4 illustrates the motor of FIG. 3 from a different aspect.
Figure 5:
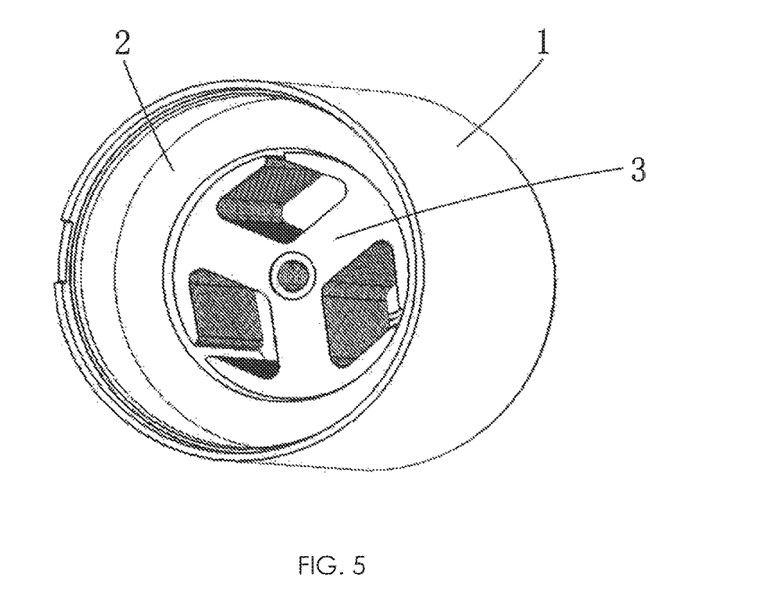
FIG. 5 is an isometric view of the housing, stator magnet and rotor core of the motor of FIG. 3.
Figure 6:
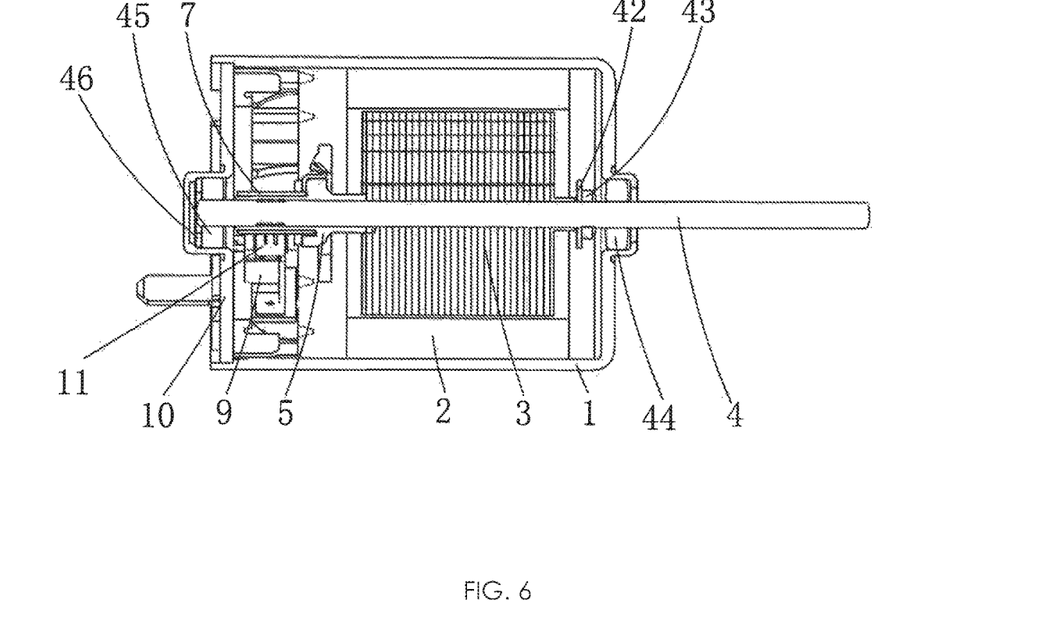
FIG. 6 is a sectional view of the motor of FIG. 3.
Figure 7:
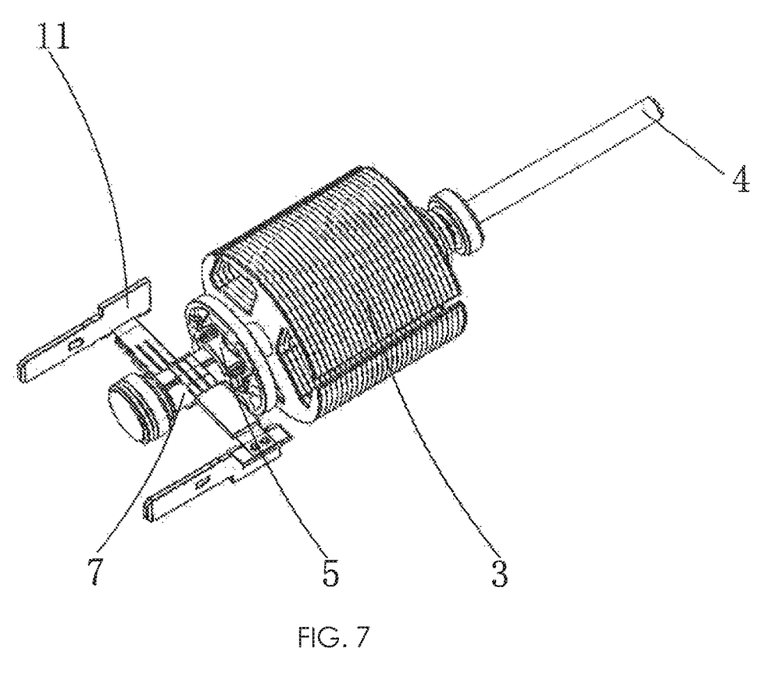
FIG. 7 shows the rotor and brushes of the motor of FIG. 3, with the windings omitted.

Referring to FIG. 4, a first vent hole 122 is formed in a bottom of the housing 1. Referring to FIG. 7, a second vent hole 104 is formed the cover 10. Air may pass through the motor via the vent holes 104, 122.

The outer diameter of the stator magnet 200 of the known PMDC motor of FIG. 1 is 22.8 mm, the inner diameter is 18.8 mm, the axial length is 20 mm, and the weight is 9.82 g; the outer diameter of the rotor core 300 is 17.9 mm, the axial length is 13.5 mm, and the weight is 15.39 g; the weight of the rotor windings is 6.45 g.

In the PMDC motor according to the preferred embodiment of the present invention, the outer diameter of the stator magnet 2 is 22.8 mm, the inner diameter is 16.4 mm, the axial length is 17 mm, and the weight is 12.19 g; the outer diameter of the rotor core 3 is 15.9 mm, the axial length is 14 mm, the weight is 11.63 g; the weight of the rotor windings is 4.72 g. In comparison with the known motor, the size and weight of the rotor core as well as the weight of the rotor core are reduced, while the same performance requirements are met. As such, this reduces the total weight and hence the rotational inertia of the rotor, thereby reducing the noise produced by of the motor during operation. The increased thickness of the stator magnet, increases the stiffness of the stator, which further reduces the noise produced by the motor during operation. In addition, the total weight and total cost of the motor are reduced accordingly.

Figure 11:
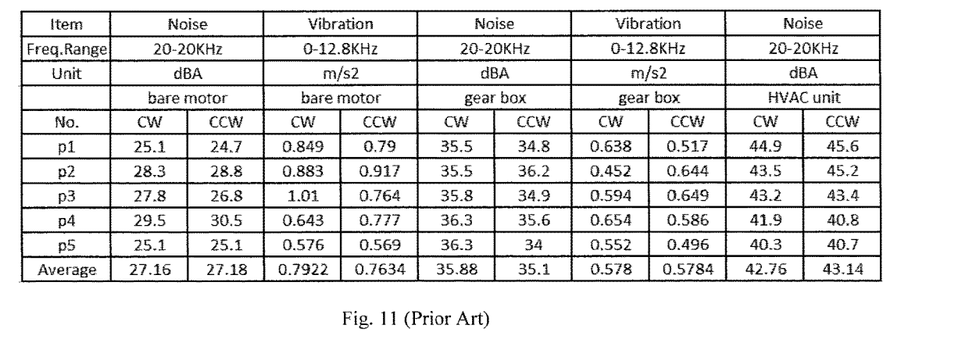
FIG. 11 is a table showing noise and vibration test results of the known PMDC motor.
Figure 12:
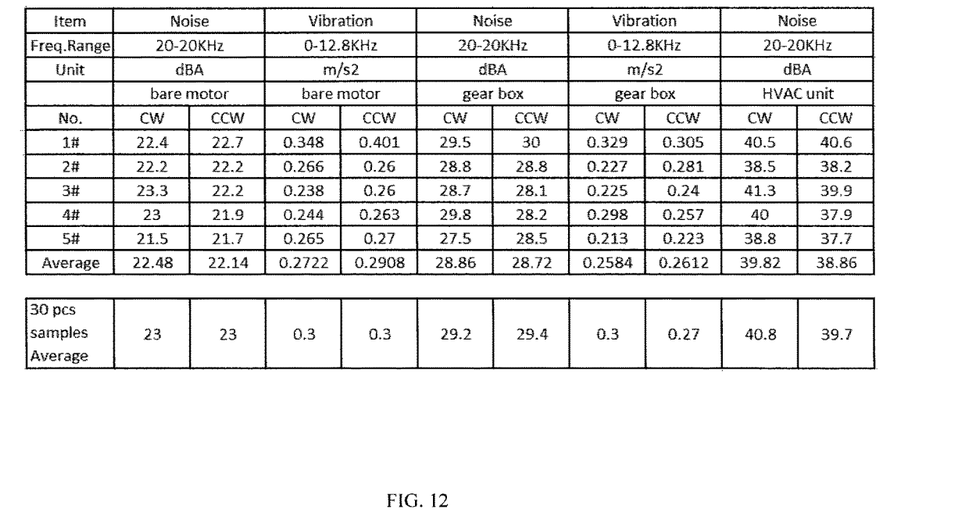
FIG. 12 is a table showing noise and vibration test results of the PMDC motor according to preferred embodiment of the present invention.

A noise test and vibration test were conducted with respect to the known motor and the motor of the preferred embodiment, and the test results are shown in FIG. 11 and FIG. 12, respectively. As can be seen, the noise and vibration of the motor itself and the rotor core of the motor of the present invention and the entire vehicle HVAC system are lower than those of the known motor in both forward and reverse working states.

In summary, according to the present invention, the noise of a permanent magnet direct current motor during operation is reduced by increasing the thickness of the stator magnet and reducing the outer diameter of the rotor core to reduce the rotational inertia of the rotor core. This improves the quality of the PMDC motor and satisfies the consumers' requirement of low noise for use in vehicle HVAC systems.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A permanent magnet direct current motor comprising:
    stator comprising: a housing, a stator magnet disposed in an interior of the housing, and an end cap assembly,
    a rotor comprising: a shaft, a rotor core mounted on the shaft and disposed within the stator magnet, rotor windings wound around the rotor core, a commutator fixed on the shaft, a plurality of commutator segments disposed on an outer surface of the commutator,
    wherein the end cap assembly comprises: a plastic end cap fitted to one end of the housing, a cover disposed on an outer side of the end cap, and brushes mounted to the end cap, and
    a ratio of an outer diameter of the rotor core to the outer diameter of the housing is from 0.60 to 0.659, inclusive,
    an outer diameter of the rotor core is 15.9 mm, the stator magnet has a radial thickness of 3.2 mm, and the outer diameter of the housing is 24.6 mm.

2. The motor of claim 1, wherein a positioning ring is disposed on the shaft adjacent one end of the rotor core.

3. The motor of claim 2, wherein a first bearing is fitted to the shaft adjacent the positioning ring, and a spacer is disposed between the positioning ring and the bearing.

4. The motor of claim 3, wherein the cover is a metal part and a bearing hub is formed in an inner surface of the cover, an end of the shaft adjacent the commutator is mounted to a second bearing fitted to the bearing hub, and a thrust bearing is disposed between a distal end of the shaft and the bearing hub in an axial direction of the shaft.

5. The motor of claim 1, wherein a plurality of posts and bosses are formed on an end surface of the end cap, the cover has a plurality of through holes and positioning slots, corresponding to the posts and bosses, and the posts and bosses are disposed in the through holes and the positioning slots, respectively, to mount the cover to the end cap.

6. The motor of claim 1, wherein a bearing is fitted to a bottom of the housing, and the shaft extends through the bearing to outside the housing.

7. The motor of claim 1, wherein a first vent hole is formed in a bottom of the housing, and a second vent hole is formed in the cover.

8. The motor of claim 1, further comprising two motor terminals mounted to the end cap, wherein the brushes comprise two finger leaf brushes, each of the brushes having one end fixedly connected to a corresponding one of the motor terminals and another end arranged to make sliding electrical contact with the commutator.

9. The motor of claim 8, wherein the brushes comprises a brush arm and a vibration damper attached to the brush arm.

10. The motor of claim 9, wherein a thickness of the brush arm is 0.065 mm.

11. The motor of claim 8, wherein the connection points of the two brushes and the two motor terminals are located on a diameter of the end cap passing through a rotational axis of the shaft.

12. The motor of claim 1, wherein the stator magnet is a ferrite magnet.

13. The motor of claim 1, wherein the stator magnet is a rubber bonded magnet.

14. The motor of claim 1, wherein opposite ends and slots of the rotor core are coated with an insulating resin.

15. The motor of claim 1, wherein a rated output power of the motor is less than 2 Watts.

16. A permanent magnet direct current motor comprising:
    stator comprising: a housing, a stator magnet disposed in an interior of the housing, and an end cap assembly,
    a rotor comprising: a shaft, a rotor core mounted on the shaft and disposed within the stator magnet, rotor windings wound around the rotor core, a commutator fixed on the shaft, a plurality of commutator segments disposed on an outer surface of the commutator,
    wherein the end cap assembly comprises: a plastic end cap fitted to one end of the housing, a cover disposed on an outer side of the end cap, and brushes mounted to the end cap, and
    a ratio of an outer diameter of the rotor core to the outer diameter of the housing is from 0.60 to 0.659, inclusive,
    the stator magnet is a single-piece cylindrical magnet, or a rectangular slab rolled into a cylinder or ring,
    wherein an outer diameter of the rotor core is 15.9 mm, the stator magnet has a radial thickness of 3.2 mm, and the outer diameter of the housing is 24.6 mm.

17. The motor of claim 16, wherein a gap between the rotor core and the stator magnet is 0.25 mm.

18. The motor of claim 16, wherein an axial length of the stator magnet is 17 mm, and an axial length of the rotor core is 14 mm.

* * * * *